April 14, 1936.  A. C. FISCHER  2,037,507

COMPOSITION MATERIAL

Original Filed July 9, 1928

Inventor:
Albert C. Fischer,
By Albert H. Robinson atty.

Patented Apr. 14, 1936

2,037,507

UNITED STATES PATENT OFFICE 2,037,507

COMPOSITION MATERIAL

Albert C. Fischer, Chicago, Ill., assignor to The Philip Carey Manufacturing Company, a corporation of Ohio Application July 9, 1928, Serial No. 291,324
Renewed December 28, 1933

1 Claim. (Cl. 108—8)

This invention relates to the manufacture of constructional material, and pertains particularly to weather protecting elements such as roofing, siding, and the like, which are fabricated from fiberized bituminous material into preformed strips ready for use.

The invention consists in the features, combinations and arrangements hereinafter described or claimed, for carrying out the above stated objects and such other objects as will hereinafter appear.

Generally described, the invention comprises the production of strips from a composition of linear fibers and bituminous material which has been thoroughly mixed into a homogeneous mass. A small proportion of mineral material may also be included in the mass to give a hardening influence and other advantages to the resulting product. The bituminous material used in the mixture is preferably blown asphalt to which is added a quantity of hardening asphalt. When these ingredients are suitably compounded strips can be produced which are slightly flexible, but nevertheless will flow under sufficient pressure, as distinguished from breaking apart in brittle particles. Either before or after being hardened, the strips may be surfaced with a coating and finished with a smooth face.

In forming constructional strips in accordance with this invention a suitable mixture is formed by heating bituminous material to fluid condition, and adding linear fibrous material and mineral material thereto, in which fluid condition all the ingredients are homogeneously mixed. Then while still in a heated condition, the material is fed through a suitable extrusion machine or molding device and reduced to strips of desired form.

The bituminous material employed in this mixture is preferably blown asphalt to which is added a quantity of hardening asphalt, such as, gilsonite, grahamite or Cuban asphalt for providing a body devoid of brittleness and which is held in cohesion by the linear fibers distributed therein. The mineral material is in the nature of a reinforcing filler and is represented by such materials as limestone dust, slate dust, silica, asbestos floats, sand or similar materials.

It is desired to produce a strip having a compressive strength ranging from 1200 to 2500 lbs. per square inch, and reducing the material to about one half of its thickness so that it will have in its ultimate form a tensile strength of about 200 lbs. on a half square inch pull test. The sheet will be slightly flexible and semi-fireproof, but nevertheless will flow under pressure without breaking apart in brittle particles.

A plastic mass of the character above described may be extruded or otherwise molded in any desired form. Numeral 2 designates a preformed plane surfaced strip of uniform thickness. Numeral 3 indicates a strip embossed on one face with a series of spaced areas 4 separated by demarkations 5 to produce a simulation of individual elements, the demarkations being preferably in the form of grooves. Strips of this type are especially designed for weather protecting elements, and adapted to be laid in overlying and underlying courses with overlapping edges. These spaced areas may be further built up by having fiber-cement or slate shingles 7 attached, in which case the vertical and longitudinal depressions will serve as a pattern chart for indicating the position of the shingles thereon. It will be obvious that these strips can be divided into slabs having the simulation of two or more individual shingles thereon, or may be divided into individual shingles.

Figure 1:
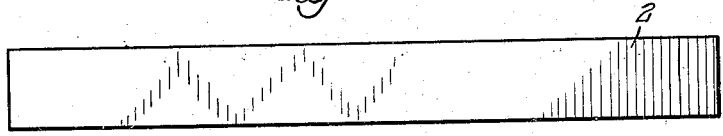
Figure 1 is a plan view of a building unit.
Figure 2:
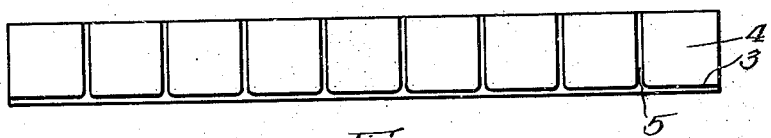
Figure 2 is a plan view of an embossed roofing.
Figure 3:
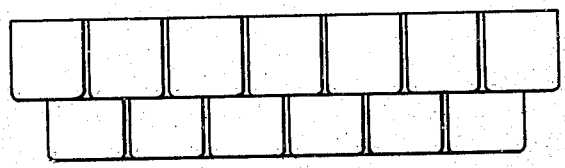
Figure 3 is a plan view of overlapping roofing courses.
Figure 4:
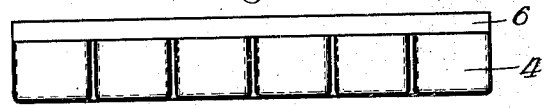
Figure 4 is a modified form of a roofing strip.
Figure 5:
Figure 5 is a plan view of a tapered weather strip.
Figure 6:
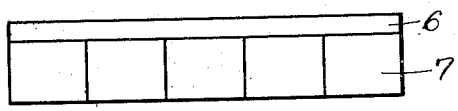
Figure 6 is a modified form of a weather strip.
Figure 7:
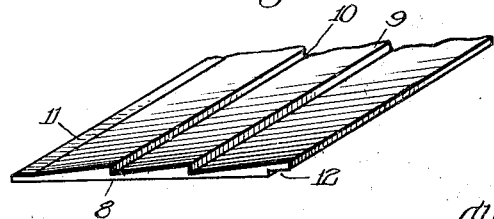
Figure 7 is a perspective view of a covering unit.

As the strips are relatively thicker than ordinary prepared roofing, one edge may be advantageously depressed to form a marginal groove 6 which is preferably of about the same depth as that of the grooves between the embossed areas. Thus access of water beneath the courses is effectively prevented. Where individual shingles are attached to the base sheet, they may be laid in contact (Fig. 5), or spaced as above described. In having the spaces of demarkation of some width, they are accentuated, thereby further simulating individual shingles.

Numeral 8 designates a siding embossed with a plurality of longitudinal ribs 9 intermediately of longitudinal depressions 10. The ribs may likewise be divided into spaced areas as in the above described roofing strip to further simulate slates or shingles or other individual elements. These strips are adapted to be laid in overlapping relation by means of a reduced edge 11 which is adapted to fit into the groove 12 of an adjacently laid strip.

Before pressing or embossing the surface of the material may be coated with dust, pigment, granulated slate or other materials contrasting in color with the bituminous material to present an element of pleasing appearance. In this operation, the granular material is embedded in the bituminous material by being compressed within the bituminous material until it is smooth with the face of the material. Or the strip may be smoothed with a coating of enamel or paint. In applying the enamel, the surface of the bituminous material may preferably be first coated with shellac or solvent primer to provide a better bond for the enamel.

Obviously the invention is not limited to the details of the illustrated typifications, all of which may be variously modified. Moreover, it is not indispensable that all features of the invention be used conjointly as certain features may be employed to advantage in different combinations and subcombinations.

Having described my invention, I claim:

Weatherproofing strips comprising a body of bituminous material, embossed areas on the surface of the body with intervening depressions, and plates attached to the embossed areas.

ALBERT C. FISCHER.